UNITED STATES PATENT OFFICE.

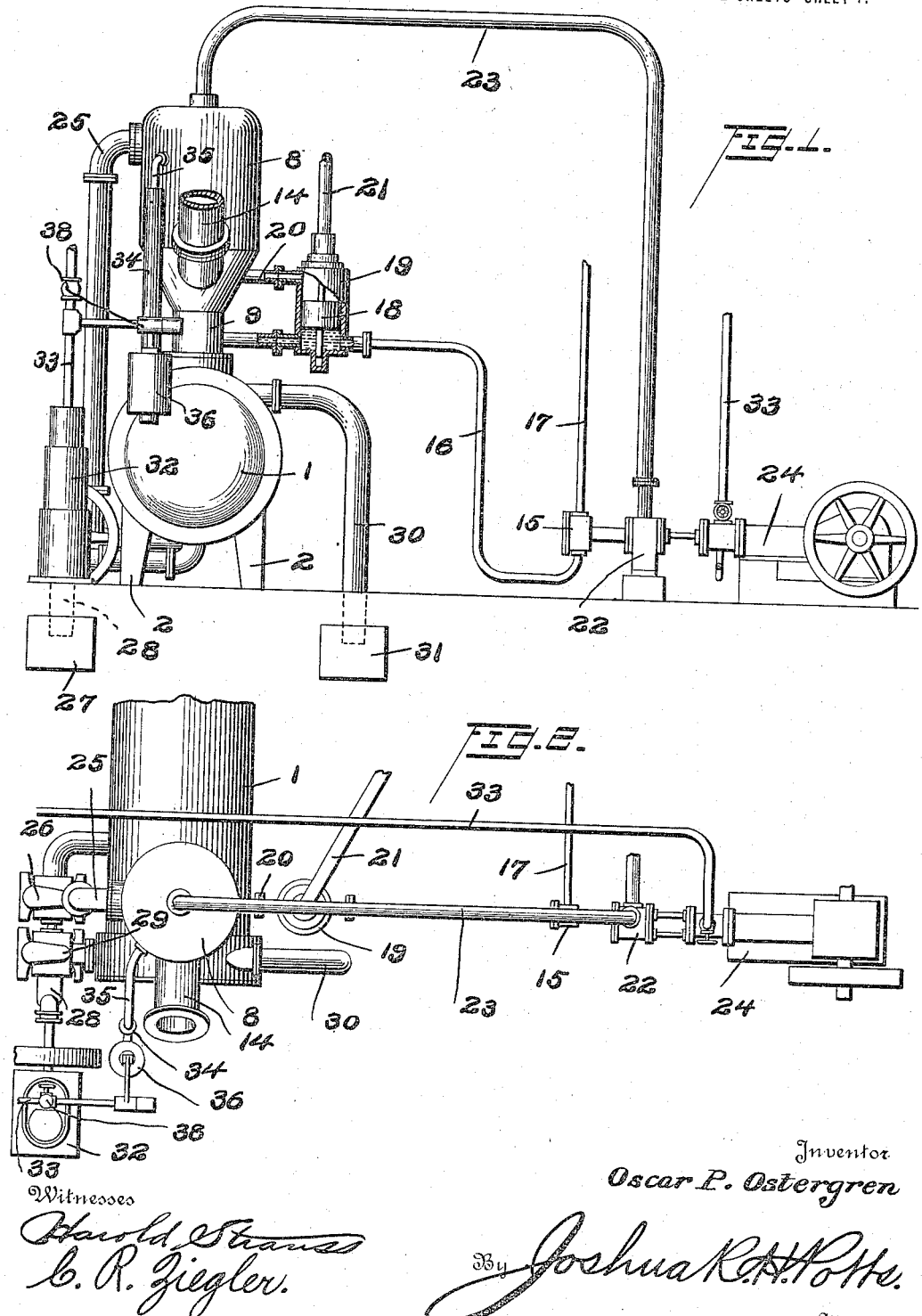

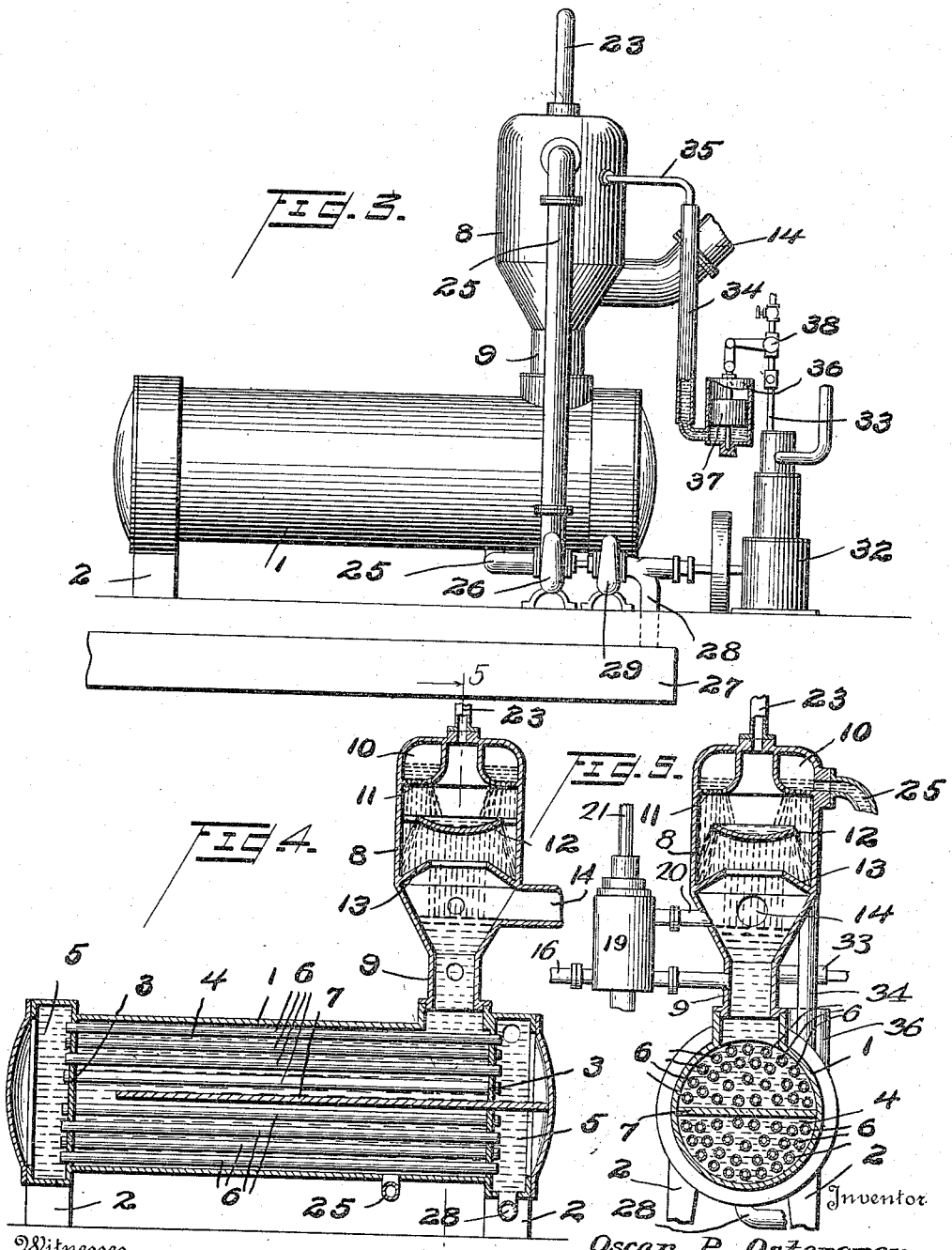

OSCAR PATRIC OSTERGREN, OF BROOKLYN, NEW YORK, ASSIGNOR OF ONE-HALF TO EDWIN LUNDGREN, OF NEW YORK, N. Y.

CONDENSING APPARATUS.

1,155,090.  Specification of Letters Patent.  Patented Sept. 28, 1915.

Application filed October 18, 1913. Serial No. 795,818.

*To all whom it may concern:*

Be it known that I, OSCAR P. OSTERGREN, a citizen of the United States, residing at Brooklyn, in the county of Kings and State of New York, have invented certain new and useful Improvements in Condensing Apparatus, of which the following is a specification.

My invention relates to improvements in condensing apparatus, the object of the invention being to provide an improved apparatus in which steam is condensed by direct contact with a shower of cooling water in a system which is maintained automatically under the desired vacuum, and which utilizes a cooling agent for reducing the temperature of the water.

A further object is to provide an efficient condensing apparatus for power or industrial purposes, whereby the highly efficient and economical principle of direct injection of water is used, regardless of the nature of the cooling water, in such a manner that the boiler water is continuously preserved.

A further object is to provide an apparatus of this character in which an independent body of fresh water, freed of air, may be utilized for injecting purposes, the said body of water to act as an intermediate agent or vehicle for the transmission of heat from the condensing steam to the transient or external cooling agent, and by such means prevent the introduction into the condenser of the gases usually carried by the injection water.

A further object is to provide a compact and efficient counter-current cooling apparatus wherein the intermediate body of water is cooled by the external body, and insure the perfect interchange of heat as a maximum of radiating surface is provided within a relatively small space.

A further object is to provide improved means for automatically controlling the pressure or vacuum in the system, and to provide automatic means for supplying water to make up for deficiencies in the system due to loss.

With these and other objects in view, the invention consists in certain novel features of construction and combinations and arrangements of parts as will be more fully hereinafter described and pointed out in the claims.

In the accompanying drawings: Figure 1 is a view in elevation partly in section illustrating my improvements. Fig. 2 is a fragmentary plan view of Fig. 1. Fig. 3 is a view in elevation at right angles to Fig. 1. Fig. 4 is a view in longitudinal section through the condensing chamber and the counter-current apparatus, and Fig. 5 is a view in section on the line 5—5 of Fig. 4.

1 represents my improved counter-current cooling apparatus which is of general cylindrical form horizontally disposed and supported upon feet 2. This counter-current cooling apparatus is provided adjacent its ends with partitions 3, dividing the same into a relatively long intermediate chamber 4 and relatively short end chambers 5.

A plurality of tubes 6 extend through the partitions 3, and connect the end chambers 5, while a horizontal partition 7 extends through one of the partitions 3, dividing one end chamber 5 into an upper and lower compartment, and this partition 7 extends to a point adjacent the other partition 3 for a purpose which will hereinafter appear.

My improved condenser *per se*, 8, is supported upon the counter-current cooling apparatus 1, and at its lower restricted end 9 communicates with the top of the counter-current cooling apparatus as clearly shown in Figs. 4 and 5. Condenser 8 is provided in its upper end with an annular water chamber 10 having a perforated bottom 11 through which the water falls in a spray upon baffles 12 and 13 before it enters the lower end 9 of the condenser.

14 represents a steam inlet which discharges into the condenser below the baffle 13, and as this steam rises, it contacts with the falling shower or spray and is condensed, the water accumulating in the condenser being drawn off by a pump 15 through a pipe 16, and discharged through a pipe 17 to a hot water tank or directly to the boiler.

The level of water in the condenser is controlled by a float valve 18 in a valve casing 19 communicating at its lower end with pipe 16, and at its upper end connected by a pipe 20 with the condenser 8. The float valve 18 controls the supply of water from an inlet pipe 21, and the position of the float valve is controlled by the level of liquid in the condenser.

It is of course to be understood that the pump 15 will be operated at a speed to carry off the water as it condenses from the steam, but in case there is a discrepancy, the difference will be made up by water which enters through pipe 21 as controlled by the float valve 18. The air and gases accumulating in the condenser are drawn off by a pump 22 connected to the top of the condenser by a pipe 23, and this air and gas is designed to be discharged into the atmosphere by said pump 22.

An engine 24 is adapted to drive both the pumps 15 and 22.

25 represents a water pipe which connects the bottom of the counter-current cooling apparatus 1 with the top of the condenser 8, and discharges into chamber 10. Between the ends of this pipe 25, a pump 26 is located and operates to force a continuous flow of water from the bottom of the counter-current cooling apparatus to the top of the condenser, so that a uniform spray may be had through the condenser at all times.

The water in the counter-current cooling apparatus is cooled by water which is drawn from a source of supply 27 through a pipe 28 between the ends of which latter, a pump 29 is provided. Water from the pipe 28 enters the lower compartment of chamber 5, then flows through the lower set of tubes 6 to the other chamber 5, thence through the upper set of tubes 4 to the upper compartment of the first-mentioned chamber 5, and thence through an outlet pipe 30 to a receptacle 31 to receive the same. The water of condensation therefore gives up its heat to the cooling agent, and the latter has a continuous flow through the chambers and tubes as above explained, so that a large heat transmitting surface is had. This is particularly true as the water from the condenser is compelled to pass around the partition 7 and in its journey through the counter-current cooling apparatus will have its temperature reduced, so that when at its lowest temperature, it will be discharged into chamber 10 and contact with the steam, hence the highest temperature of liquid will be in the lower reduced end 9 of the condenser, and the lowest temperature of water will be in the upper chamber 10.

32 represents an engine which drives both pumps 26 and 29, and 33 is a steam pipe which supplies steam to this engine 32 and also to the engine 24 above referred to. The passage of steam to both of these engines is controlled by a barometric governor 34 which consists of a vertical column connected at its upper end by a pipe 35 with the condenser 8, and at its lower end communicating with a float chamber 36 having a float 37 therein. The float 37 controls the operation of a valve 38 in the steam pipe 33 and the position of this float is controlled by the mercury in the column and in the lower end of the chamber 36. If the vacuum falls in the condenser, the mercury will accumulate in the lower end of the chamber 36, causing the float to rise and causing the valve 38 to open wider, which will compel the engines to speed up and hence speed up the pumps so that the proper vacuum will be restored.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. The combination with a cooler, of a condenser located on top of the cooler, means for maintaining the cooler and the lower portion of the condenser full of water with a fixed water level in the condenser, means for forcing the water from the bottom of the cooler into the condenser, means for directing steam into the condenser over the water level in the path of the water therethrough, a means governed by the pressure in the condenser for regulating the speed of the said forcing means, substantially as described.

2. The combination with a cooler, of a condenser in communication therewith, means for drawing water from the cooler and spraying the same into the condenser, means for directing steam into the condenser in the path of the spray and means governed by the pressure in the condenser for regulating the spray, substantially as described.

3. The combination with a cooler, of a condenser located on top of the cooler, means for maintaining the cooler and the lower portion of the condenser full of water with a fixed water level in the condenser, a pipe connecting the bottom of the cooler with the top of the condenser, a pump for circulating water therethrough, means in the condenser compelling the water to fall in a spray therethrough, means for directing steam into the condenser over the water level into the path of said spray, and means governed by the pressure in the condenser for regulating the speed of said pump, substantially as described.

4. The combination with a cooler, of a condenser located on top of the cooler, means for automatically maintaining the cooler and the lower portion of the condenser full of water with a fixed water level in the condenser, a pipe connecting the bottom of the cooler with the top of the condenser, a pump for forcing water from said cooler to said condenser, means in the condenser compelling the water to fall in a spray therethrough, means for directing steam into the condenser into the path of said spray, and means controlled by the pressure in the condenser for regulating the speed of said pump, substantially as described.

5. In a device of the class described, a cooler, a superimposed condenser in communication therewith, a pump and connections for drawing water from said cooler and injecting the same into said condenser, a motor for driving said pump, means for directing steam into said condenser, a chamber, a float therein, a barometric column having its lower end in communication with said chamber and its upper end in communication with said condenser, an operative connection between said float and said motor whereby variation of pressure within said condenser will control the operation of said motor, substantially as described.

6. In a device of the class described, a cooler, a superimposed condenser in communication therewith, means for circulating the cooling medium through said cooler, means for withdrawing water from the said cooler and injecting the same into said condenser, means for conducting steam into said condenser, and means controlled by the pressure within said condenser for varying the speed of the means for circulating the cooling medium and the means for injecting the water into said condenser, substantially as described.

7. In a device of the class described, a cooler, a superimposed condenser in communication therewith, means for conducting steam into said condenser, means for withdrawing water from said cooler and injecting the same into said condenser, means for maintaining a constant level of water in said cooler and condenser, and an eduction pipe leading from said condenser below the level of water therein to constitute a feed pipe for a boiler, substantially as described.

8. In a device of the class described, a cooler, a superimposed condenser in communication therewith, means for maintaining a constant level of water in said cooler and condenser, an eduction pipe leading from said condenser below the level of water therein and constituting a feed pipe for a boiler, means for conducting steam within said condenser above the water level therein, means for drawing water from said cooler and injecting the same into said condenser, and means governed by the pressure within said condenser for controlling the last-mentioned means, substantially as described.

In testimony whereof I have signed my name to this specification in the presence of two subscribing witnesses.

OSCAR PATRIC OSTERGREN.

Witnesses:
 ALMA M. OSTERGREN,
 A. LUDLOW PERKINS.

Copies of this patent may be obtained for five cents each, by addressing the "Commissioner of Patents, Washington, D. C."